US011159601B1

(12) United States Patent
Benami et al.

(10) Patent No.: US 11,159,601 B1
(45) Date of Patent: Oct. 26, 2021

(54) TRIGGERING A CONTENT-RELATED ACTION BASED ON A NETWORK IDENTIFIER

(71) Applicant: Amazon Technologies, Inc., Seattle, WA (US)

(72) Inventors: Daniel Benami, San Francisco, CA (US); Kevin Moran, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 152 days.

(21) Appl. No.: 16/161,606

(22) Filed: Oct. 16, 2018

(51) Int. Cl.
*H04L 29/08* (2006.01)
*H04W 76/10* (2018.01)
*H04W 84/12* (2009.01)

(52) U.S. Cl.
CPC .............. *H04L 67/06* (2013.01); *H04L 67/10* (2013.01); *H04L 67/303* (2013.01); *H04W 76/10* (2018.02); *H04W 84/12* (2013.01)

(58) Field of Classification Search
CPC ...... H04W 76/10; H04W 84/12; H04L 67/06; H04L 67/10; H04L 67/303
USPC ......................................................... 709/219
See application file for complete search history.

(56) References Cited

U.S. PATENT DOCUMENTS

| | | | |
|---|---|---|---|
| 9,414,222 B1* | 8/2016 | Dixon | H04L 67/22 |
| 9,609,484 B1* | 3/2017 | Rodoper | H04W 4/029 |
| 9,749,849 B1* | 8/2017 | Bradish | G06F 16/955 |
| 9,819,610 B1* | 11/2017 | Crump | H04L 47/805 |
| 10,735,503 B2* | 8/2020 | Shattil | H04L 41/147 |
| 2003/0120817 A1* | 6/2003 | Ott | H04L 12/1859 709/249 |
| 2004/0203863 A1* | 10/2004 | Huomo | G01S 5/02 455/456.1 |
| 2006/0056336 A1* | 3/2006 | Dacosta | H04L 67/2847 370/328 |
| 2007/0032225 A1* | 2/2007 | Konicek | F24F 11/30 455/417 |
| 2010/0223352 A1* | 9/2010 | Roka | H04L 67/322 709/217 |
| 2012/0209946 A1* | 8/2012 | McClure | H04L 41/0893 709/217 |
| 2013/0066936 A1* | 3/2013 | Krishnan | H04L 67/289 709/201 |
| 2014/0155050 A1* | 6/2014 | Choi | H04W 4/80 455/418 |

(Continued)

OTHER PUBLICATIONS

Wi-Fi Alliance, "Wi-Fi Protected Setup Specification," Version 1.0h., Dec. 2016, 110 pages.

*Primary Examiner* — James E Springer
(74) *Attorney, Agent, or Firm* — Kilpatrick Townsend & Stockton LLP

(57) ABSTRACT

Techniques for triggering a content-related action based at least in part on an identifier of an access point are described. In an example, a computing device may determine an identifier of an access point based at least in part on a connection between the computing device and the access point. Based at least in part on the identifier, the computing device may access, a profile associated with the access point and may determine, from the profile, a content-related action to perform based at least in part on the connection between the computing device and the access point. The computing device may initiate the content-related action.

20 Claims, 7 Drawing Sheets

(56) References Cited

U.S. PATENT DOCUMENTS

| | | | |
|---|---|---|---|
| 2014/0342772 A1* | 11/2014 | Mulcahy | H04W 88/06 |
| | | | 455/553.1 |
| 2016/0234335 A1* | 8/2016 | Hu | G06Q 10/101 |
| 2018/0348718 A1* | 12/2018 | Richardson | G08B 21/22 |

* cited by examiner

TRIGGERING A CONTENT-RELATED ACTION BASED ON A NETWORK IDENTIFIER

BACKGROUND

Content services provide different functionalities to end users including, for example, streaming music, watching video on demand, and other content-related functionalities. Generally, a content server may support a content service by hosting content. Availability of the content to a user device may depend on a number of factors, such as whether a data network path exists between the user device and the content server. If such a path exists, the user device may receive the content from the content server for presentation to an end user. Otherwise, the content may not be sent from the content server to the user device. In other words, when the user device is online, the user device may stream music and/or video from the content server. However, if the user device is offline, such content-related functionalities may not be possible.

BRIEF DESCRIPTION OF THE DRAWINGS

Various embodiments in accordance with the present disclosure will be described with reference to the drawings, in which.

DETAILED DESCRIPTION

Figure 1:
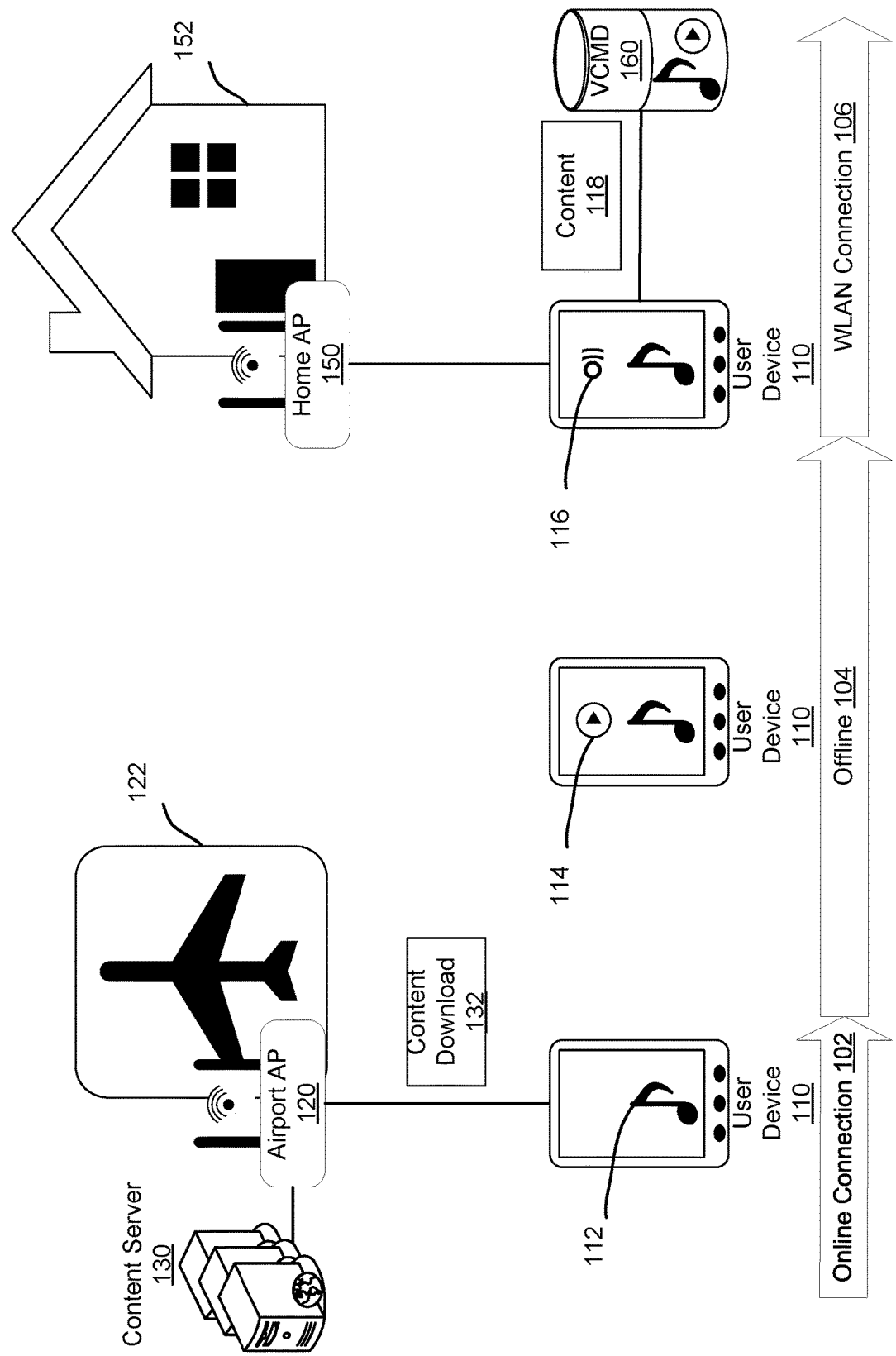
FIG. 1 illustrates an example computing environment for triggering different content-related actions based on network identifiers, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a content service that provides content to user devices based at least in part on an expected content need given a detected network identifier, such as a service set identifier (SSID) of an access point. In an example, the detection of the network identifier may trigger a specific content-related action to satisfy the expected content need.

For instance, a user device may implement a content application configured to receive and present content from a content server. Upon connection to the access point, a data network path may become available between the user device and the content server. The content application may identify the network identifier of the access point and look-up a profile of this access point based at least in part on the network identifier. The profile may identify the content-related action, where this action may be defined for execution at least in part while the connection to the access point exists to satisfy the expected content need by taking advantage of the connection. Accordingly, the content application may initiate the content-related action.

To illustrate, consider an example of playing music on a smartphone. The smartphone may execute a music application for receiving and playing music from a music server. At one point in time, the smartphone may connect to a wireless access point located at an airport. The music application may receive the SSID of the wireless access point from an operating system (OS) of the smartphone and may accordingly look-up a profile of this access point, where the profile may be stored locally on the smartphone. This profile may indicate that music files should be downloaded from the music server, in anticipation that the connection may soon be terminated and that no alternative WiFi connection to the music server may exist for some time (e.g., because of an expectation that the smartphone may be carried on a flight). Accordingly, the content application may automatically download music files from the music server. These music files may be played on the smartphone after the connection is terminated, thereby satisfying the expected need for music availability even after the connection to the airport's wireless access point is terminated. At a different point in time, the smartphone may connect to a wireless access point on its home network. Here also, the content application may receive the SSID of this access point, look-up the corresponding profile, and determine based at least in part on the profile that music currently playing on the smartphone should be cast to a smart speaker connected to the home network. Accordingly, the content application may start casting the music to the smart speaker via the access point, thereby satisfying the expected need for immersed and high quality music experience.

Embodiments of the present disclosure may provide many technical advantages. In particular, an expected content need may be defined based at least in part on a connection to an access point and mapped to a content-related action defined in a profile of the access point. The detection of an identifier of the access point may be used as a trigger to automatically initiate the content-related action to satisfy the need. In comparison, many existing technologies may not support such automation. Thus, upon the lack of a network connection, such content services may no longer be available to a user device. Other existing technologies may support automatic content downloads. However, the support may be limited to geographic locations, rather than accounting for an expected content need based at least in part on a connection to an access point. Because geographic locations are needed, special permissions to receive and use location data may be necessary, thereby often resulting in deactivation of the automatic content downloads on user devices. Further, because an automatic content download may not actually account for an expected content need, the downloaded content may not be needed and presented and the content download may amount to a waste of network bandwidth, computationally processing, and/or memory space.

In the interest of clarity of explanation, embodiments of the present disclosure are described in connection with music content and connections to wireless local area networks (WLANs). However, the embodiments are not limited as such and similarly apply to other types of content and connection. Generally, a content-related action can be defined for any type of content, such as video, media files, executable code. This action can be repeated (e.g., executed at different times on a user device) and can be defined to satisfy a content need based at least in part on multiple factors including, for instance, metrics associated with the need. The connections need not be to a WLAN, but may be to any type of network including, for instance, wide area networks, private networks, public networks supporting any type of technology, whether wired, WiFi, cellular, or other technologies.

FIG. 1 illustrates an example computing environment for triggering different content-related actions based on network identifiers, according to an embodiment of the present disclosure. As illustrated, the computing environment may include a user device 110, a first access point 120, a content server 130, a second access point 150, and a second user device 160. Each content-related action may be defined for an access point and may be triggered based at least in part on an identifier of the access point. In this way, a triggered content-related action may be performed as a result of a connection between the user device 110 and the corresponding access point.

Two examples of content-related actions are described including music download and music cast. The first content-related action (e.g., the music download) may be triggered based at least in part on a connection between the user device 110 and the first access point 120. FIG. 1 illustrates this connection with the online connection arrow 102 indicating that the user device 110 may have online access to the content server 130 via the first access point 120. The second content-related action (e.g., the music cast) may be triggered based at least in part on a connection between the user device 110 and the second access point 150. FIG. 1 illustrates this connection with the WLAN connection arrow 106 indicating that the user device 110 may have access to at least a WLAN via the second access point 150. Of course, other types of content-related actions are possible for the same or different types of connections and access points, as further described herein below.

Generally, the user device 110 may be any computing device configured to receive and process content, such as a smartphone, a tablet, a laptop, a desktop computer, or any other suitable end user device. In an example, the user device 110 may host a content application that supports the music download and music cast, among other functionalities (e.g., music play).

The first access point 120 may be located at a first location 122 and may be a wireless access point of a network installed at the first location 122. This wireless access point may support, for instance, WiFi connection. Upon connecting to the first access point 120, the user device 110 may gain access to the content server 130 over the network and other networks (e.g., the Internet). For illustrative purposes, FIG. 1 shows the first location 122 as an airport. In this case, the first access point 120 may represent a wireless access point installed at the airport and may be referred to as an airport access point.

While the user device 110 is connected to the first access point 120, the need to download music may be expected. For instance, and referring back to the illustrative airport example, this need may be based at least in part on an expectation that the WiFi connection is temporary and that the user device 110 may no longer have a WiFi connection for some time after termination of the WiFi connection to the airport access point (shown in FIG. 1 with an offline arrow 104). Hence, and based at least in part on a detection of the SSID of the first access point 120, the user device 110 may perform the first content-related action (e.g., the music download) defined for the SSID.

As a result, the user device 110 may receive a content download 132 (e.g., music files, metadata, etc.) from the content server 130 via the first access point 120. The downloaded content 112 (e.g., the music files and metadata) may be stored in memory of the user device 110 for use. When the user device 110 goes offline (as illustrated with the offline arrow 104), music can be played 114 on the user device 110 by using the downloaded content 112 from the memory and without further need to access the content server 130.

Referring back to the illustrative airport example, the user device 110 may initially connect to the airport access point. Upon launching the content application, the user device 110 may start streaming music from the content server 130. While the content application is running in the foreground or the background, or even when the content application is no longer running, the content download 132 may be sent from the content server 130 to the user device 110 via the airport access point. Upon going offline, the content application may be launched again, as needed, and may play 114 the stored music on the user device 110 from local memory.

At a different point in time, the user device 110 may connect to the second access point 150. The second access point 150 may be located at a second location 152 and may be a wireless access point of a network installed at the second location 152. This wireless access point may support, for instance, WiFi connection. The network may include the second user device 160 that is also connected to the second access point 150. Upon connecting to the second access point 150, the user device 110 may gain access to the network at the second location 152 and other networks (e.g., the Internet).

For illustrative purposes, FIG. 1 shows second location 152 as a user home. In this case, the second access point 150 may represent a wireless access point providing access to a home network with which the user device 110 may be registered (e.g., based on the Mobile Internet protocol—Mobile IP). This wireless access point may be referred to as a home access point. In this example, the second user device 160 may be a smart speaker, a voice-controlled multimedia device (VCMD), or some other end user device suitable for being connected to the home AP and for presenting content.

While the user device 110 is connected to the second access point 150, the need to cast music may be expected. For instance, and referring back to the illustrative home example, this need may be based at least in part on an expectation of an immersive music experience that relies on high quality speaker system of the second user device 160 (e.g., the smart speaker of the VCMD). Hence, and based at least in part on a detection of the SSID of the second access point 150, the user device 110 may perform the second content-related action (e.g., the music cast) defined for the SSID.

As a result, the user device 110 may send or mirror content 118 to the second user device 160 via the second access point 150 or directly over a WiFi channel established between the two devices. The content 118 may include the stored music 112 or any music that is currently being streamed from the content server 130 via the second access point 150. In response, the second user device 160 may play the received music.

Referring back to the illustrative home example, upon arrival to the home location, the user device 110 may connect to the home AP point. Upon launching the content application, the content application may detect the SSID of the home AP and initiate the music cast. While the content application is running in the foreground or the background, the smart speaker or VCMD may play the music received from the user device 110.

Other content-related actions and use cases are possible. In an example, a content-related action may include a content synchronization. For instance, the user device 110 may be relocated to a coffee shop (or some other location managed by an entity). A WLAN may be available and may include an access point and a computing device of the entity playing music streamed from the content server 130. Upon connecting to the access point at the coffee shop, the content application may detect the corresponding SSID. A content-related action may be defined for that SSID, whereby this action may include synchronizing the music playing on the user device 110 with the music playing in the coffee shop on the entity's computing device. In this case, the content server 130 may send the same music content already being streamed on the entity's content device to the user device 110 to accomplish this synchronization.

In yet another example, a content-related action may include a content upload. For instance, this action may be defined for a particular access point (e.g., the home access point), whereby content should be uploaded to a server (e.g., photos to a media server). Upon connecting to the access point and a detection of a corresponding SSID, the content upload may be performed by sending new photos from the user device 110 to the server via the access point.

Figure 2:
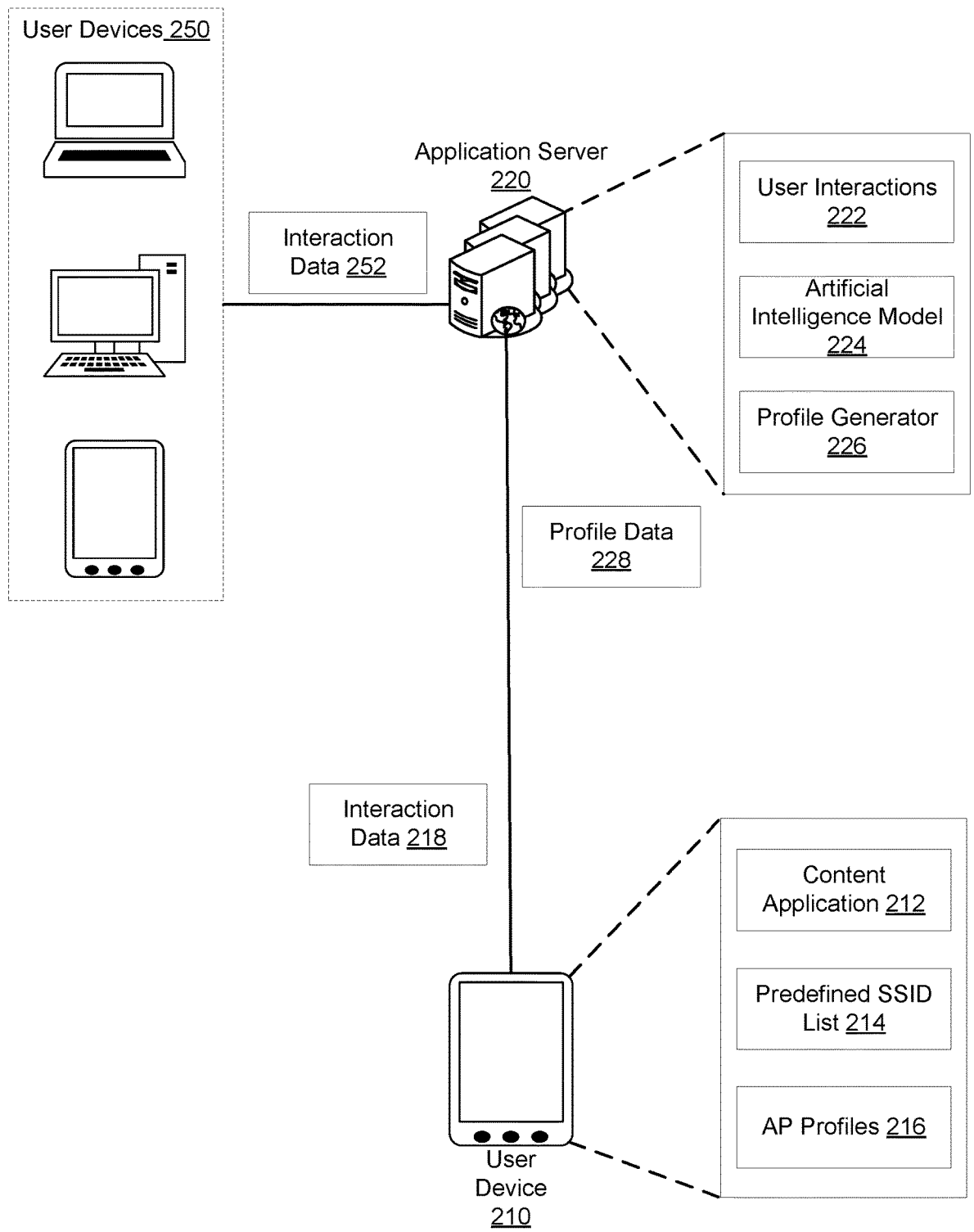
FIG. 2 illustrates an example computing environment for configuring access point profiles that support different content-related actions, according to an embodiment of the present disclosure.

FIG. 2 illustrates an example computing environment for configuring access point profiles that support different content-related actions, according to an embodiment of the present disclosure. Generally, an access point profile may be generated for an access point and may define, among other things, one or more content-related actions to be performed upon a detection of a connection to the access point. The one or more content-related actions may be determined based at least in part on expected content need(s), where the need(s) may be satisfied depending on the existence of the connection. Various techniques are available to generate the access point profile. Example techniques may rely on a history user interactions and is further described herein next in connection with FIG. 2. Other example techniques may rely on user preferences, inferences from network identifiers of access points, service agreements, and/or device registrations as further described herein below.

As illustrated, the computing environment may include a user device 210, an application server 220, and other user devices 250 of various types. Generally, the user device 210 may be similar to the user device 110 described herein above in connection with FIG. 1, may host a content application 212, and may store a predefined SSID list 214 (or a predefined list of any other identifiers usable to identify network access points), and access point profiles 216. The predefined SSID list 214 and/or access point profiles 216 may be hardcoded in the content application 212 or may be stored in local memory of the user device 210 separately from the content application 212. Upon a connection between the user device 210 and an access point, the content application 212 may receive the SSID (or any other type of identifier) of the access point from the OS of the computing device over an OS application programming interface (API). The content application 212 may look-up the predefined SSID list 214 to find a matching SSID and may access one of the access point profiles that corresponds to the matching SSID. Accordingly, the content application 212 may initiate the content-related action defined in this profile.

In addition, the user device 210 may report user interaction data 218 to the application server 220. In an example, the application server 220 may be managed by a service provider of the content application 212 and the reporting may be based at least on this type of common management. The user interaction data 218 may include data detected by the content application 212 based on interactions of a user of the user device 210 with the content application 212. This data may identify the connected access point (e.g., may include the SSID), the user device 210 (e.g., may include the media access control (MAC) address of the user device 110, a cookie downloaded to the user device 110, etc.), a status of the content application 212 (e.g., alive and running in the foreground, alive and running in the background, not running), the content that was downloaded and/or played by the content application 212, time of day of such interactions, time length of the connection to the access point, amount of content (e.g., data size), bit rate, and bandwidth used, and/or other detected interaction data. The user device 210 may also host other applications provided by the service provider. Some or each of these applications may similarly detect interactions of the user therewith and the user interaction data 218 may include the corresponding interaction data.

Further, each of the user devices 250 may include similar computing components as the user device 210 (e.g., a content application, predefined SSID list, access point profiles, etc.) and may report user interaction data to the server application. The collective user interaction data from the user devices 250 is show as interaction data 252 in FIG. 2.

The application server 220 may be managed by the service provider and may store content applications, such as the content application 212, that can be downloaded therefrom to user devices. Generally, the application server 220 may be a hardware server or a cloud server hosted on computing hardware within a datacenter.

In an application, the application server 220 may store, in a local or a remote data store, the received interaction data from the user device 210 and user devices 250, as user interactions 222. These user interactions 222 may represent a history of network interactions of the user of the user device 210 and other users of the other user devices 250 with corresponding content application(s) and/or other applications provided by the service provider, where these network interactions were facilitated via access points connected to the user device 210 and user devices 250.

The application service 220 may also host an artificial intelligence model 224. Some or all of the user interactions 222 (e.g., the history of user interactions) may be input to the artificial intelligence model 224. Based at least in part on training, the artificial intelligence model 224 may be configured to determine content-related actions that would satisfy expected content needs given the presences and absences of connections to access points. The artificial intelligence model 224 may include, for instance, a machine learning model (e.g., a particular type of an artificial neural network, random forest model, etc.), a regression model, or other models that may inherently learn features or otherwise predict the content-related actions.

Further, the application service 220 may host a profile generator 226. This profile generator 226 may generate an access profile for an access point or an update to the profile based at least in part on the content-related action(s) determined by the artificial intelligence model 224 as being applicable to the access point. For example, the profile generator 226 may first generate an empty profile associated with an SSID of an access point, and may over time add a description(s) of the applicable content-related action(s) and other definitions needed by the content application 212 to perform such actions. The profile generator 226 may send (e.g., based on a push or upon a pull) profile data 228 to the user device 210. This profile data 228 may include access point profiles (which the user device 210 may store as access point profiles 216) and/or updates thereto.

Different techniques may be available to process the user interactions 222 to then determine the content-related actions and set the access point profiles. Generally, the used technique may consider multiple factors, such as whether an access point profile should be specific to an access point or specific to a category to which the access point belongs, and whether the access point should be specific to user interactions received from the user device 110 only or specific to user interactions received from multiple user devices.

In an example technique, an access point profile may be generated specifically for an access point and a user device. This may be used, for instance, for generating profiles of home access points. In this example, the history of network interactions associated with the SSID of the access point and an identifier of the user device may be input to the artificial intelligence model 224. In other words, a subset of the user interactions 222 may be the input, where this subset may include interaction data that identifies both the access point and the user device. In this example, the access point profile may be downloaded to the user device, but not to other user devices.

In another example technique, an access point profile may be generated specifically for an access point and may be applicable to a large number of (or all) user devices. This may be used, for instance, for generating a profile of an access point commonly accessed by a large number of user devices, where each user device may frequently or infrequently connect to the access point (e.g., for an airport access point). In this example, the history of network interactions associated with the SSID of the access point and, optionally, with identifiers of the user devices may be input to the artificial intelligence model 224. In other words, a subset of the user interactions 222 may be the input, where this subset may include interaction data that identifies at least the access point. In this example, the access point profile may be downloaded to the different user devices.

In a further example technique, an access point profile may be generated specifically for a category of access points and a user device. This may be used, for instance, for generating a profile applicable to multiple access points that may share a common connectivity pattern when the user device is connected thereto (e.g., for access points at different locations and managed by a connectivity provider, where a user of the user device may have an account with the connectivity provider for connecting to the access points). In this example, the history of network interactions associated with an identifier of the user device and, optionally, with the SSIDs of the access points may be input to the artificial intelligence model 224. In other words, a subset of the user interactions 222 may be the input, where this subset may include interaction data that identifies at least the user device. In this example, the artificial intelligence model 224 may include a classifier that may classify the access points into categories (e.g., home, airport, coffee shop, office, etc.) each associated with an expected content need and may determine the content-related action(s) applicable to each category given the interaction data specific to the user device. The resulting access point profile may identify the category and may be downloaded to the user device, but not to other user devices.

In yet another example technique, an access point profile may be generated specifically for a category of access points and may be applicable to a large number of (or all) user devices. This may be used, for instance, for generating a profile applicable to multiple access points generally available to be connected to multiple user devices and where the use of each access point may be common across the user device for the category (e.g., for an open access point at a coffee shop). In this example, the history of network interactions (e.g., the user interactions 222) may be input to the artificial intelligence model 224. Here also, the artificial intelligence model 224 may include a classifier that may classify the access points into categories (e.g., home, airport, coffee shop) each associated with an expected content need and may determine the content-related action(s) applicable to each category given the interaction data across the different user devices. The resulting access point profile may identify the category and may be downloaded to the different user devices.

In the above example techniques, an access point may have multiple SSIDs. For instance, multiple SSIDs may be used for a WiFi home AP, one for a 5 GHz frequency band, one for a 2.4 GHz frequency band, and one for an open connection for guest devices. A classifier of the artificial intelligence model 224 may associate these SSIDs with the same access point based on the related interaction data (e.g., by analyzing the data including the SSIDs, identifiers of user devices, network location of the user devices, connection lengths, timings of the connections, etc.). The application server 220 may then associate these SSIDs to a same access point profile.

In embodiments, depending on the type of user information obtained and/or analyzed (e.g., the interaction data 252), appropriate measures are taken to ensure protection of the collected data, to empower the users to determine what data can be used, as well as empower the users to indicate which portions of the collected data or user information should be deleted and/or no longer obtained by the application server 220. Depending on the depending on the type of information to be analyzed, appropriate measures are taken to ensure the protection of the data, and to empower the user to determine what data can be used for this purpose.

As mentioned herein above, other techniques may be possible to generate an access point profile. Such techniques may be used in addition or alternative to the above techniques that rely on the artificial intelligence model 224 and may rely on user preferences, inferences from network identifiers of access points, and/or service agreements.

In an example of a user preferences technique, the content application 212 may present a user interface, such as a graphical user interface (GUI) to a user of the user device 210. The user interface may be configured to user input associating a network identifier of a particular access point (e.g., the corresponding SSID) and/or a particular access point category with a particular content-related action. In other words, the user input may define that for the particular access point or category, the particular content-related action should be performed (e.g., for home AP, cast music from the user device 210), thereby indicating a user preference for that action given the access point. When used along with any of the above artificial intelligence techniques, the user interface may allow the user to edit the generated access point profiles 216, such that they can be modified according to the user preferences.

In an example of a network identifier inference technique, an access point profile may be generated based at least in part on an inference from the network identifier of the corresponding access point (e.g., the SSID). The content-related action defined in the profile may be common to a category of access points to which the access point belongs. The inference may indicate that the network access point may belong to the category. For instance, if the SSID includes the word "airport" or "coffee," an inference may be made the access point belongs to a category of airport access points or coffee shop access points. Content-related action defined for the category (e.g., based on the user interaction 222 and/or by using the artificial intelligence model 224) may be added to the profile. Of course, different techniques may be used for the inference. In one example, each category may be associated with a list of words and the inference may be made by matching a portion or all of the SSID with one or more words from the list. In another example, machine learning may be used to predict the category given the SSID.

In an example of a service agreements technique, the service provider of the content application 212 may have a service agreement with an entity that manages a location where an access point may be installed. The service agreement may specify that, upon a connection of a user device to the access point, a particular content-related action should be performed (e.g., synchronization of music, presentation of particular targeted content, etc.). Based at least in part on the service agreement, the service provider may rely on a user interface provided by the application server to generate an access point profile for the access point, where this profile may include the particular content-related action.

In an example of a device registration technique, a registered user device (e.g., a smart speaker, a voice-controlled multimedia device (VCMD), etc.) may be on a network and may have a registration with a service provider under a user account. The registration may identify the access point of the network and/or the category of the access point (e.g., the SSID and/or access point is home access point, access point is at the airport, etc.). Registration information of this device and other registered user devices may be imported or accessible to application server 220. In turn, the application server 220 may generate a list of SSIDs and identify the corresponding categories (e.g., home, airport, etc.) from the registration information. The relevant access point profiles may be linked to the SSIDs accordingly.

Figure 3:
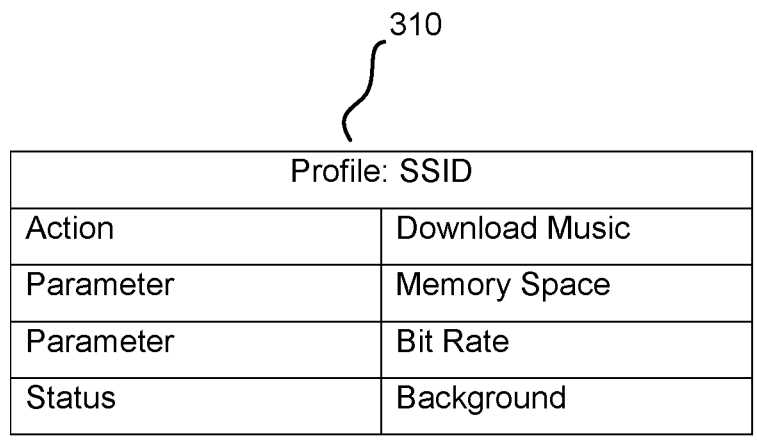
FIG. 3 illustrates examples of access point profiles, according to an embodiment of the present disclosure.
Figure 3:
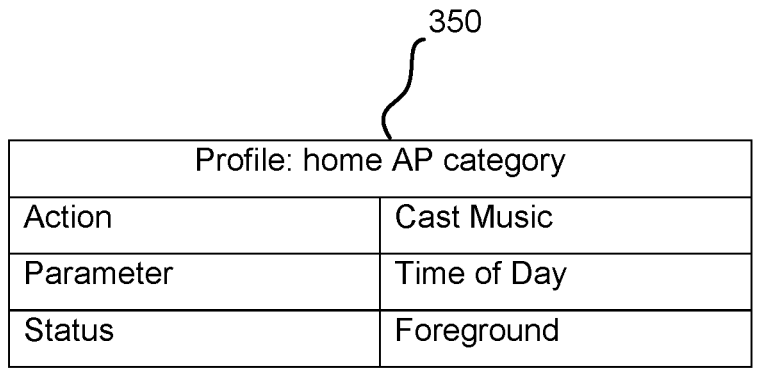

FIG. 3 illustrates examples of access point profiles, according to an embodiment of the present disclosure. A first profile 310 may define a music download and a second profile 350 may define a music cast. Referring back to the illustrative airport and home examples, the first profile 310 may be defined, for instance, for an airport access point (e.g., the first access point 120 of FIG. 1), whereas the second profile may be defined for a home access point (e.g., the second access point 150 of FIG. 1). Of course other access point profiles may be similarly defined. A profile associated with an access point may be referred to as an access point profile and may represent a set of rules defining one or more content-related actions to be performed by a computing device, an application server, and/or a content server upon a detection of an identifier the access point (e.g., the SSID), where this detection indicates that the computing device may have established a data connection to the access point.

Generally, an access point profile associated with an access point may identify the access point (e.g., include the corresponding SSID) or a category to which the access point belongs. In addition, the access point profile may identify a content-related action(s) to be at least initiated by a content application of a user device upon a connection between the user device and the access point. Further, the access point profile may identify one or parameters and, optionally, a status of the content application for initiating or performing the content-related action. The content-related action(s), parameter(s), and application status(es) may be defined based on a history of network interactions (e.g., by inputting the relevant user interactions to an artificial intelligence model configured, based at least in part on training, to define these action(s), parameter(s), and application status(es)), user preferences, service agreements, and/or network identifier inferences.

As illustrated, the first profile 310 may include the SSID of the airport access point and identify that music download should be initiated upon connection of the user device to that access point. This profile 310 may also include two parameters for the music download. The first parameter may describe the needed memory space of the user device, such as a percentage of the free memory space (e.g., ten percent, indicating that the amount of music to be downloaded should equate to ten percent of the device's free memory space). The second parameter may define a bit rate for the music download. The bit rate may be hard coded to a value (e.g., "1 Mbps") given the history of network interactions seen at the access point, including the history of bit rates. In this case, the value be derived by an artificial intelligence model (e.g., the artificial intelligence model 224 of FIG. 2) based on the history of network interactions. In another example, the bit rate may be defined as a function of different factors such that the bit rate can be dynamic and determined in real-time. For instance, this parameter may set the bit rate as a function of the signal strength, network latency, and other real time analysis of connection-related factors.

Furthermore, the first profile 310 may indicate that the music download should be performed when the content application is running in the background. As such, upon a connection between the user device and the access point and upon the content application running in the background, a download of music files from a content server via the access point may be initiated by the content application. The download may be limited to a number of files such that, when stored on the user device, these music files would only use ten percent of the free memory space (or whatever amount is defined by the first parameter) and would be downloaded at the identified bit rate.

In comparison, the second profile 350 of the second access point may identify a category of the access point (e.g., that the access point is a home access point) and that a music cast should be initiated when the user device connects to an access point belonging to that category (e.g., to a home access point). This profile 350 may also include a parameter for the music cast describing, for instance, the time of day for the music cast and/or the type of content to be cast given the time of day (e.g., news in the morning, soothing music in the evening). Optionally, the second profile 350 may indicate that the music cast should be performed when the content application is running in the foreground. As such, upon a connection between the user device and a home access point, upon the content application running in the foreground, and depending on the time of day, the content application may perform music casting.

Figure 4:
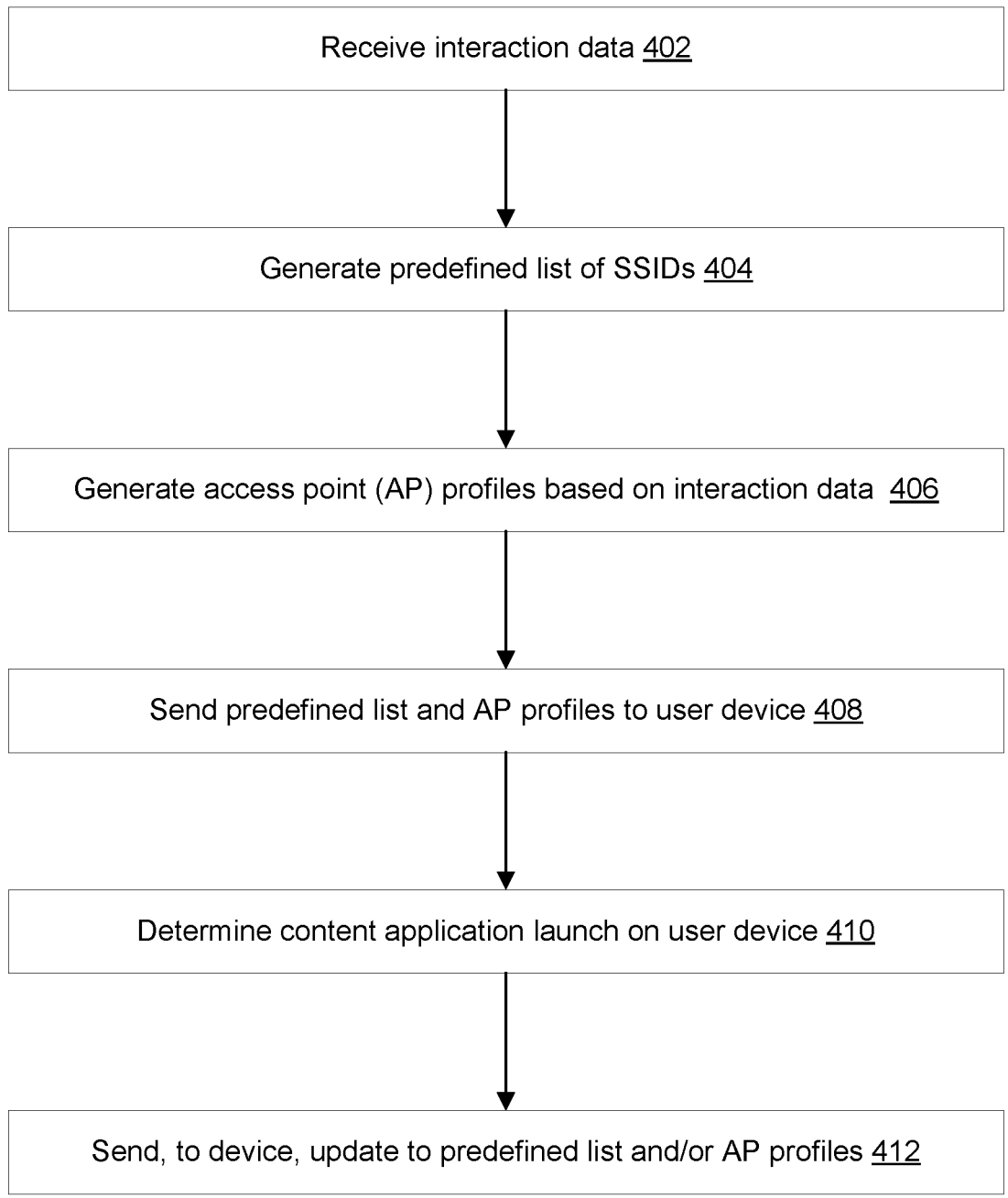
FIG. 4 illustrates an example flow for generating access point profiles, according to an embodiment of the present disclosure.
Figure 5:
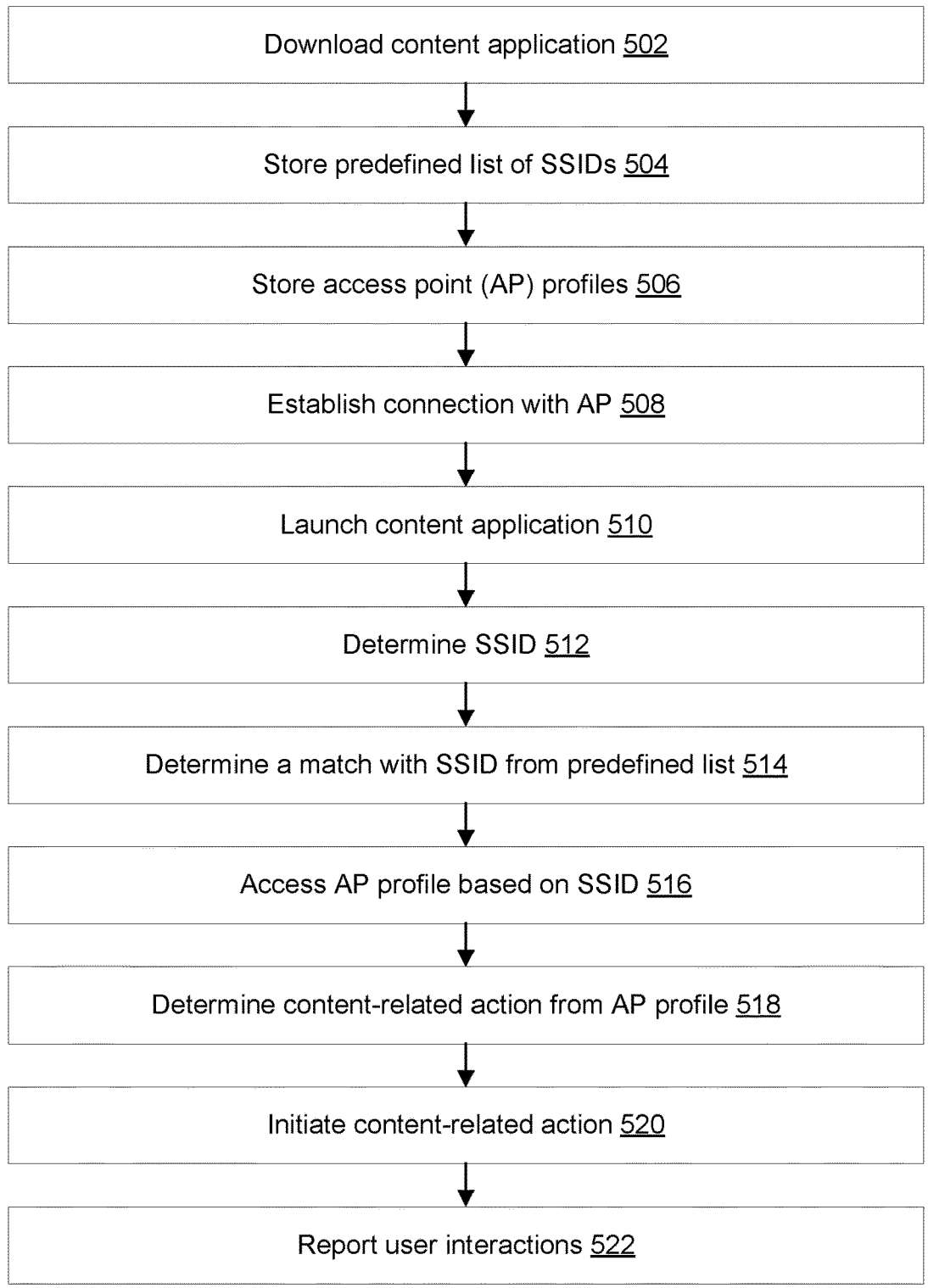
FIG. 5 illustrates an example flow for triggering different content-related actions based on network identifiers, according to an embodiment of the present disclosure.
Figure 6:
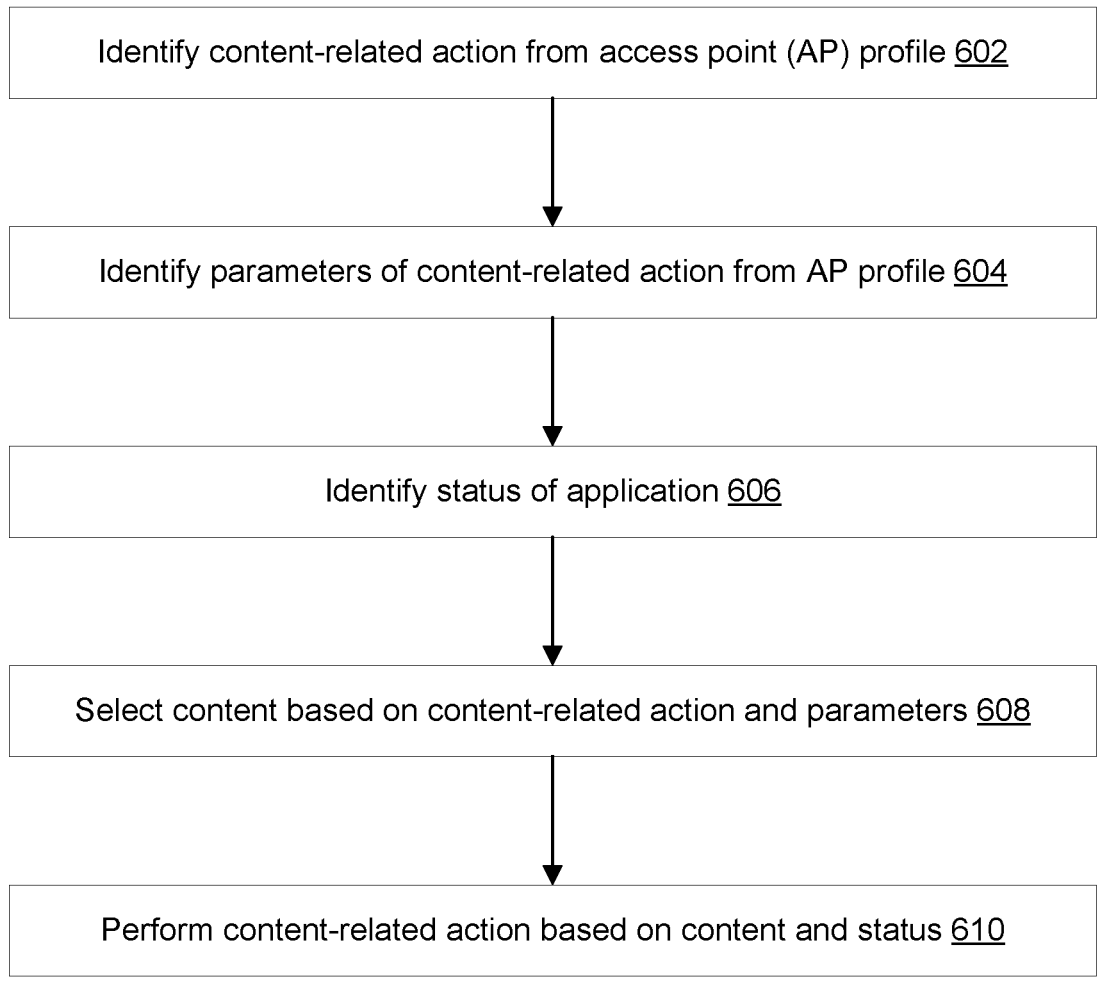
FIG. 6 illustrates an example flow for performing a content-related action, according to an embodiment of the present disclosure.

FIGS. 4-6 illustrate example flows for triggering a content-related action based at least in part on a network identifier of an access point, according embodiments of the present disclosure. Instructions for performing the operations of the flow can be stored as computer-readable instructions on a non-transitory computer-readable medium of a computer system, such as one that includes a user device and/or an application server. As stored, the instructions represent programmable modules that include code or data executable by a processor(s) of the computer system. The execution of such instructions configures the computer system to perform the specific operations shown in the figures and described herein. Each programmable module in combination with the processor(s) represents a means for performing a respective operation(s). While the operations are illustrated in a particular order, it should be understood that no particular order is necessary and that one or more operations may be omitted, skipped, and/or reordered.

FIG. 4 illustrates an example flow for generating access point profiles, according to an embodiment of the present disclosure. The example flow may start operation 402, where an application server may receive interaction data. In an example, the interaction data may be received from multiple user devices based at least in part on user interactions with one or more applications hosted on these devices, where the user interactions may invoke content functionalities of the application(s) necessitating access to data networks via access points to receive content. The interaction data may identify the access points (e.g., include their SSIDs), the user devices (e.g., include their MAC addresses), the content, time of day of user interactions, time length of the connections to the access points, amounts of content (e.g., data sizes), bit rate, and bandwidth used, and/or other detected interaction data. The application server may store the received interaction data as a history of network interactions.

At operation 404, the application server may generate a predefined list of SSIDs. In an example, the predefined list may include identifiers of access points (e.g., the SSIDs) identified in the interaction data. In another example, the predefined list may also include a category for each SSID (e.g., whether a home access point, an access point at an airport, an access point at a coffee shop, etc.). In this example, an artificial intelligence model may be configured to classify the access points into the categories based at least in part on the interaction data. In yet another example, the predefined list may be specific to a user device by including SSIDs (and, optionally, their categories) that the user device has connected to previously. Alternatively, the predefined list may be common to multiple or all user devices, where an SSID is added to the predefined list based on at least one of these user devices having connected to the corresponding access point previously.

At operation 406, the application server may generate access point profiles based at least in part on the interaction data. In an example, the interaction data may be input to the artificial intelligence model configured to, based at least in part on the training, determine one or more content-related actions, one or more parameters, and one or more application statuses for each SSID and/or for each category of access points. This determination can also be specific to each user device or be applicable to multiple or all of the user devices. A profile generator may add each content-related action and associated parameter(s) and application status(es) to a profile specific to a corresponding access point or specific to a corresponding category of access points.

At operation 408, the application server may send the predefined list of SSIDs and the access point profiles to a user device. In an example, upon a request from the user device to download a content application from the application server, such application may be sent to the user device, along with the predefined list and the access point profiles.

At operation 410, the application server may determine a launch of the content application on the user device. In an example, when the content application is first run on the user device, the content application may send status data indicating the launch. This data may be sent from the user device to the application server.

At operation 412, the application server may send, to the user device, an update(s) to the predefined list of SSIDs and/or the access point profiles based at least in part on the determination of the launch. In an example, the application server may receive additional interaction data from the user device and/or other user devices over time. This additional interaction data may identify new SSIDs or that previously identified SSIDs are no longer in use. This data mays also be input, at time intervals, to the artificial intelligence model that, in turn, may generate updates to or new content-related action(s) and associated parameter(s) and application status(es). Such changes may be sent to the user device such that the user device may store the most up to date predefined list and access point profiles.

FIG. 5 illustrates an example flow for triggering different content-related actions based on network identifiers, according to an embodiment of the present disclosure. In an example, the example flow may start at operation 502, where a user device may download a content application from an application server.

At operation 504, the user device may store a predefined list of SSIDs. This list may be stored in local memory of the user device. In an example, the predefined list may be received from the application server based at least in part on the download of the content application. In another example, the predefined list may be generated based at least in part on a user interface presented by the content application. User input at the user interface may define, edit, and/or update the predefined list. In yet another example, the predefined list may be automatically generated and/or updated upon a connection between a user device and an access point. In particular, the content application may determine and add, as needed, the SSID of the access point to the predefined list.

At operation 506, the user device may store access point profiles. These profiles may be stored in the local memory of the user device. In an example, the access point profiles may be received from the application server based at least in part on the download of the content application. In another example, the access point profiles be generated based at least in part on the user interface presented by the content application. User input at the user interface may define, edit, and/or update access point profiles based at least in part on user preferences.

At operation 508, the user device may establish a connection with an access point. In an example, the connection may be established based at least in part on an authentication.

At operation 510, the user device may launch the content application. In an example, user input may be received at the content application to trigger the launch. Based at least in part on the launch, the user device may also receive an update(s) to the predefined list and/or access point profiles and, accordingly, update the predefined list and/or access point profiles.

At operation 512, the user device may determine an SSID (or some other identifier) of the access point. In an example, the content application may receive the SSID from the OS of the user device via an OS API.

At operation 514, the user device may determine a match between the SSID and at least one of the SSIDs from the predefined list. In an example, the content application may compare the SSID to the ones on the predefined list and perform character or word matching. The matched SSID may identify a matched access point for which an access point profile may be stored in the local memory of the user device. Additionally, the content application may look-up the corresponding category of the matched access point from the predefined list.

At operation 516, the user device may access an access point profile based at least in part on the SSID. In an example and based at least in part on the match, the content application may use the matched SSID or matched category to look-up the access point profiles and identify the one corresponding to the matched access point or matched category.

At operation 518, the user device may determine a content-related action(s) from the access point profile. In an example, this action may be defined in the profile, along with one or more parameters and one or more application status(es) defined for at least initiating or performing the content-related action.

At operation 520, the user device may initiate the content-related action. In an example, the content application may execute this action based at least in part on the parameter(s) and application status(es). For instance, if the content-related action includes a music download, the content application may download music files from a content server via the access point, where the download may be subject to memory space and bit rate constraints and may be carried over when the content application is running in the background.

At operation 522, the user device may report user interactions to the application server. In an example, the content application may detect the user interactions therewith and may report these interactions as interaction data to the application server.

FIG. 6 illustrates an example flow for performing a content-related action, according to an embodiment of the present disclosure. Operations of this example flow may be performed as sub-operations of the example flow of FIG. 5. As illustrated, the example flow of FIG. 6 may start at operation 602, where a content application hosted on a user device may identify the content-related action from an access point profile of an access point.

At operation 604, the content-related application may determine, from the access point profile, the parameter(s) associated with the content-related action. At operation 606, the content application may determine, from the access point profile, the application status(es) associated with the content-related action.

At operation 608, the content application may select content based on the content-related action and parameter(s). In an example, the content-related action (e.g., music download) may specify the type of content (e.g., music) and the parameter(s) may set constraints about the type, amount, or processing the content (e.g., memory space size or total number of files, bit rates, etc. for music files). The content may be selected to meet the imposed type and constraints. Different selection techniques may be possible including ones based on user preferences, popular content, recommendations based on recent content presented on the user device, a history of content received by the user device via the access point, and/or a history of content received by multiple user devices via the access point. For instance, if the content-related action is to download music, a particular music file may be selected based at least in part on a history of music downloads via the wireless access point to the user device or to multiple user devices. The music file may have a size that meets any memory space constraints and may be downloadable at a particular bit rate. In an example, an artificial intelligence model may be configured to, based at least in part on training, to perform the selection given the history and the parameter(s) of the content-related action. This artificial intelligence model may be local to the user device or may be accessible via an API call from the application server.

At operation 610, the content application may perform the content-related action based at least in part on the selected content and the application status. In an example, the content application may request the selected content from a content server or may retrieve this content from local memory, as applicable. Upon detection that the current status of the content application meets the application status, the content-related action may be executed to process the content. To illustrate, consider the example of the music download. If the application status indicates a foreground status, the content may be requested and downloaded from the server when the content application is running in the foreground. If the application status indicates a background status, the content may be requested and downloaded from the server when the content application is running in the background. Even if the application status indicates that the content application need not be running, the music download may still be performed. For instance, the OS of the user device may launch the content application temporarily in the background via an API at time intervals to determine whether any tasks should be performed by this content application. Upon such a launch, the content application may determine the SSID, access the access point profile, and determine that the music download should be performed. The content application may initiate the download, and the content server may queue the music files and send them to the user device for processing by the OS.

Although the operations in the flow figures are illustrated as being performed by an application server or a user device, some of the operations may be distributed between the two. For example, upon determining a content-related action and associated parameters by the user device, information about this determination may be sent to the application server. In turn, the application server may select and send the content to the user device.

Figure 7:
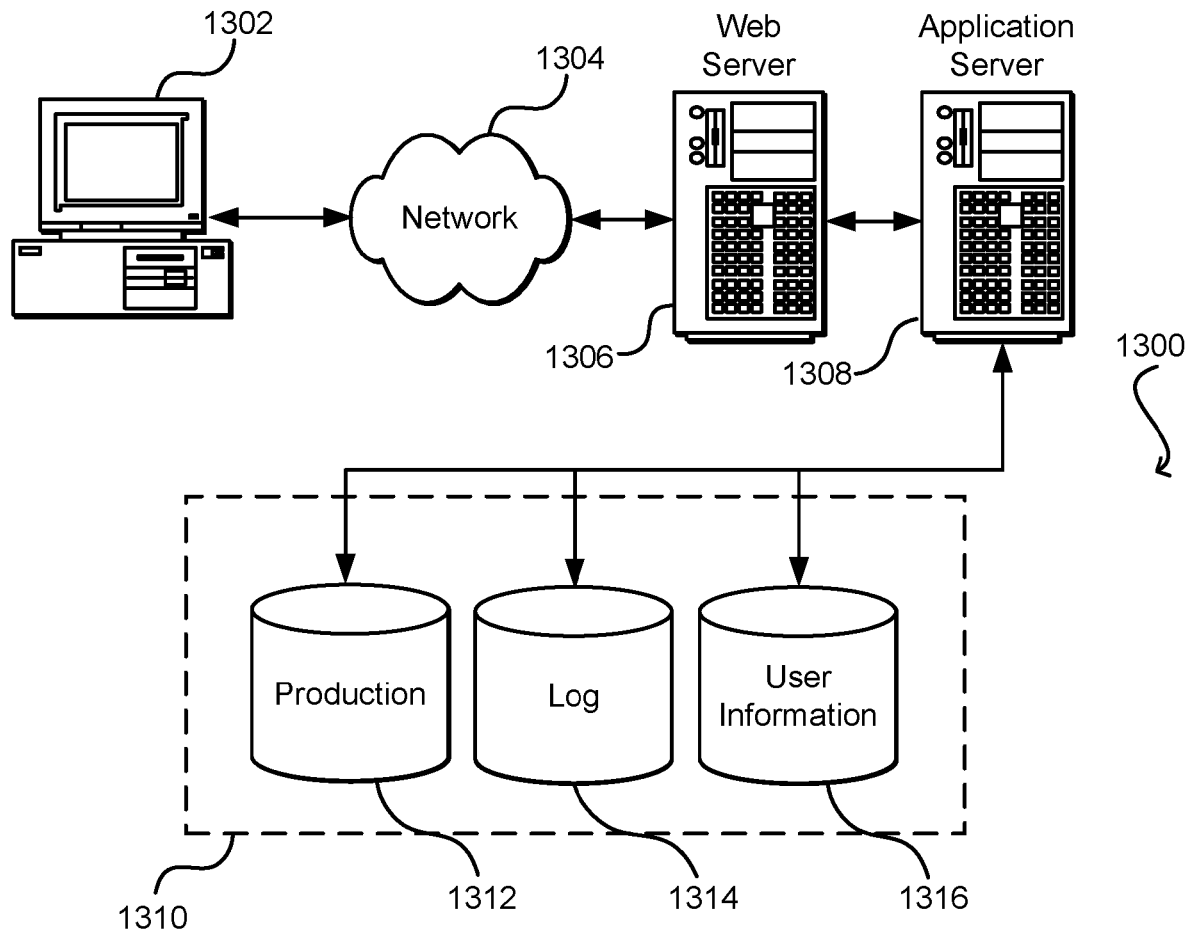
FIG. 7 illustrates a computer architecture diagram showing an example computer architecture, according to an embodiment of the present disclosure.

FIG. 7 illustrates a computer architecture diagram showing an example computer architecture, according to an embodiment of the present disclosure. This architecture may be used to implement some or all of the systems described herein. The computer architecture shown in FIG. 7 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein.

The computer 700 includes a baseboard 702, or "motherboard," which is a printed circuit board to which a multitude of components or devices may be connected by way of a system bus or other electrical communication paths. In one illustrative embodiment, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a random access memory ("RAM") 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the embodiments described herein.

The computer 700 may operate in a networked environment using logical connections to remote computing devices and computer systems through a network, such as the local area network 720. The chipset 706 may include functionality for providing network connectivity through a NIC 712, such as a gigabit Ethernet adapter. The NIC 712 is capable of connecting the computer 700 to other computing devices over the network 720. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 718 may store other system or application programs and data utilized by the computer 700. The mass storage device 718 might also store other programs and data not specifically identified herein.

In one embodiment, the mass storage device 718 or other computer-readable storage media is encoded with computer-executable instructions which, when loaded into the computer 700, transforms the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various routines described above. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7. It should also be appreciated that many computers, such as the computer 700, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method implemented by a computing device, the method comprising:
    presenting, by a content application running on the computing device, a content file based at least in part on a connection to a content server over a data network;
    receiving, by the content application, a service set identifier (SSID) of a wireless access point of the data network;
    determining, by the content application based at least in part on a list of SSIDs, a match between the SSID and one of the SSIDs on the list;
    accessing, by the content application, a profile of the wireless access point based at least in part on the match, the profile identifying a content-related action to be performed by the content application upon the computing device being connected to the wireless access point and upon the content application having an application status, the profile further identifying the application status and a parameter of the content-related action, the application status comprising at least one of: a foreground status or a background status;
    determining, by the content application, that the content application has the application status;
    determining, by the content application based at least in part on the connection to the data network via the wireless access point, the content-related action and the parameter from the profile, the content-related action identifying a content download from the content server, and the parameter identifying a download bitrate; and
    downloading, by the content application, one or more content files from the content server based at least in part on the content download and the download bitrate.

2. The method of claim 1, further comprising:
    receiving, by the content application, a second SSID of a second wireless access point based at least in part on a new connection between the computing device and the second wireless access point;
    accessing, by the content application, a second profile of the second wireless access point based at least in part on the second SSID, the second profile indicating that the second wireless access point is on a home network of the computing device;
    determining, by the content application, a second content-related action from the second profile, the second content-related action identifying a content cast; and
    casting, by the content application based at least in part on the second content-related action, content files from the computing device to a second computing device over the home network.

3. The method of claim 1, wherein the profile of the wireless access point is generated based at least in part on an input to an artificial intelligence model, wherein the input comprises information from a history of network interactions, and wherein the artificial intelligence model is configured to identify the content-related action as an expected action based at least in part on the input.

4. The method of claim 1, wherein downloading the one or more content files comprises downloading a second content file that is selected based at least in part on a history of content downloads via the wireless access point.

5. A computing device, comprising:
one or more processors; and
one or more computer-readable storage media storing instructions that, upon execution by the one or more processors, configure the computing device to:
determine, by a content application executing on the computing device, an identifier of an access point based at least in part on a connection between the computing device and the access point;
access, by the content application and based at least in part on the identifier, a profile of the access point, the profile identifying a content-related action to be performed by the content application upon the computing device being connected with the access point and upon the content application having an application status, the profile further identifying the application status and a parameter of the content-related action, the application status comprising at least one of: a foreground status or a background status;
determine, by the content application, that the content application has the application status identified in the profile; and
initiate, by the content application, the content-related action based at least in part on the connection between the computing device and the access point and the content application having the application status, the content-related action comprising receiving content over the connection based at least in part on the parameter.

6. The computing device of claim 5, wherein the identifier comprises a service set identifier (SSID), wherein the profile is accessed based at least in part on a match between the SSID and one of a plurality of SSIDs from a list, wherein the profile defines parameters of the content-related action, and wherein the parameters identify a content download and a download bitrate from a content server.

7. The computing device of claim 5, wherein the content-related action is initiated while the connection between the computing device and the access point exists, and wherein the profile is generated based at least in part on a history of network interactions of the computing device via the access point.

8. The computing device of claim 7, wherein the history is associated with multiple computing devices.

9. The computing device of claim 5, wherein the profile is further generated based at least in part on user input associating the identifier and the content-related action.

10. The computing device of claim 5, wherein the identifier is determined by a content application that is running on the computing device and that is available from a service provider, wherein the access point belongs to a wireless local area network (WLAN) of an entity, and wherein the profile is further generated based at least in part on a service agreement between the service provider and the entity.

11. The computing device of claim 5, wherein the profile is specific to the access point and is a generated based at least in part on a history of network interactions, and wherein the history is associated with the identifier.

12. The computing device of claim 5, wherein the profile is specific to a category of access points and is a generated based at least in part on a history of network interactions, and wherein the history is associated with identifiers of the access points.

13. The computing device of claim 5, wherein the profile is further generated based at least in part on an inference from the identifier about a category of access points to which the access point belongs.

14. The computing device of claim 5, wherein the profile is further generated based at least in part on a registration of a second computing device with a service provider, wherein the registration identifies the access point.

15. One or more non-transitory computer-readable storage media storing instructions that are associated with a content application and that, upon execution by one or more processors, cause a computing device to perform operations comprising:
determining an identifier of an access point based at least in part on a connection between the computing device and the access point;
accessing, based at least in part on the identifier, a profile of the access point, the profile identifying a content-related action to be performed by the content application upon the computing device being connected with the access point and upon the content application having an application status, the profile further identifying the application status and a parameter of the content-related action, the application status comprising at least one of: a foreground status or a background status;
determining that the content application has the application status; and
initiating the content-related action based at least in part on the connection between the computing device and the access point and the content application having the application status, the content-related action comprising receiving content over the connection based at least in part on the parameter.

16. The one or more non-transitory computer-readable storage media of claim 15, wherein the operations further comprise:
downloading, from an application server, the profile and the content application; and
downloading, from the application server, an update to the profile based at least in part on a launch of the content application, wherein the update modifies at least one of the content-related action or the parameter of the content-related action identified in the profile.

17. The one or more non-transitory computer-readable storage media of claim 16, wherein the operations further comprise:
sending, to the application server, user interactions with the content application, and wherein the update to the profile is based at least in part on a history of the user interactions.

18. The one or more non-transitory computer-readable storage media of claim 15, wherein the content-related action comprises at least one of: content download, content upload, content synchronization, or content cast, wherein the parameter comprises at least one of: time of day for performing the content-related action, data amount of content, or a bit rate for performing the content-related action.

19. The one or more non-transitory computer-readable storage media of claim 18, wherein the content is selected based on a history of content received by the computing device via the access point.

20. The one or more non-transitory computer-readable storage media of claim 18, wherein the content is selected based on a history of content received by multiple computing devices via the access point.

\* \* \* \* \*